(12) United States Patent  
Sargeant

(10) Patent No.: US 7,523,562 B2
(45) Date of Patent: Apr. 28, 2009

(54) ATTACHMENT FOR A POWER TOOL GUIDE RAIL

(75) Inventor: Paul Sargeant, Wallsend (GB)

(73) Assignee: Black & Decker Inc., Newark, DE (US)

( * ) Notice: Subject to any disclaimer, the term of this patent is extended or adjusted under 35 U.S.C. 154(b) by 84 days.

(21) Appl. No.: 11/788,328

(22) Filed: Apr. 19, 2007

(65) Prior Publication Data

US 2008/0223191 A1   Sep. 18, 2008

(30) Foreign Application Priority Data

May 12, 2006   (EP)   .................................. 06113869

(51) Int. Cl.
*B23Q 17/22* (2006.01)
*B26D 7/06* (2006.01)

(52) U.S. Cl. .......................................... 33/640; 33/626
(58) Field of Classification Search ........... 33/640–641, 33/626, 628, 630
See application file for complete search history.

(56) References Cited

U.S. PATENT DOCUMENTS

| 4,335,512 | A | 6/1982 | Sheps et al. | |
| 4,539,881 | A | 9/1985 | Maier | |
| 4,608,761 | A | 9/1986 | Small | |
| 5,271,159 | A | 12/1993 | Chen et al. | |
| 5,735,054 | A | * | 4/1998 | Cole ............................ 33/471 |
| 6,256,900 | B1 | * | 7/2001 | Myers ......................... 33/640 |
| 6,298,573 | B1 | * | 10/2001 | Segal et al. ................... 33/640 |
| 6,381,864 | B1 | * | 5/2002 | Hayes ......................... 33/807 |
| 6,532,679 | B2 | * | 3/2003 | Cole ............................ 33/640 |
| 6,708,422 | B1 | 3/2004 | Stojanovski | |
| 7,373,732 | B2 | * | 5/2008 | Baida ........................... 33/640 |
| 2002/0023365 | A1 | * | 2/2002 | Cole ............................ 33/640 |
| 2003/0221329 | A1 | 12/2003 | Gompper et al. | |
| 2005/0204887 | A1 | 9/2005 | Fries | |

FOREIGN PATENT DOCUMENTS

| DE | 2554250 A1 | 6/1977 |
| DE | 8906766 U1 | 10/1989 |
| EP | 0283553 A | 9/1988 |

* cited by examiner

*Primary Examiner*—Yaritza Guadalupe-McCall
(74) *Attorney, Agent, or Firm*—Michael Aronoff; Adan Ayala

(57) ABSTRACT

An adjustable setsquare for a power tool guide rail is described. The setsquare comprises an attachment member, in the form of a bar, for locating into a channel on the guide rail. The cross section of the attachment means is generally V-shaped and arranged such that the setsquare can be removed and reattached to the guide rail with consistency, whereby the angular displacement between a reference surface of the setsquare and the intended line of cut to be made by a power tool disposed on the guide rail remains constant after each reattachment of the setsquare.

10 Claims, 5 Drawing Sheets

ATTACHMENT FOR A POWER TOOL GUIDE RAIL

CROSS-REFERENCE TO RELATED APPLICATION

This application claims priority to European Patent Application No. EP 06113869.9, filed May 12, 2006. The entire contents of that application are expressly incorporated herein by reference thereto.

FIELD OF THE INVENTION

The present invention relates to an attachment suitable for use on a guide rail. The guide rail is used to guide power tools, such as a circular saw or jigsaw, during, for example, cutting operations. The attachment can be used to set the angle of the guide rail on a work-piece with respect to a work-piece datum.

BACKGROUND OF THE INVENTION

The present invention is described below with reference to circular saws. However, this reference is not intended to limit the scope of the invention in any manner; the present invention can be used with any type of guide rail and any power tool used therewith.

Hand operated electrically powered cutting tools are typically used to cut a work-piece, such as wood panels or the like, into a desired shape or dimension. Often, the cut made by the tool needs to be straight in order to fit against or abut another straight surface. A guide rail can be used to guide the power tool along a straight edge of the rail, thereby providing a straight cut.

Typically, a guide rail consists of a piece of extruded aluminium cut to a desired length of roughly a meter or so. A rib runs along the length of the rail and the rib is arranged to cooperate with a channel formed on a base plate of a circular saw. The rib is arranged parallel to the edge of the rail along which a cut is to be made and the distance between the rib and that edge corresponds to the distance between a saw blade of a circular saw and the channel in the saw's base plate, for instance. Thus, when the saw is placed on a rail, the rib of the rail guides the saw blade along an edge of the rail.

A professional end-user, such as a cabinet maker or the like, often needs to make a cut in a work-piece at a predetermined angle with respect to a datum on the work-piece. The datum is typically an edge of the work-piece (which might have been pre-cut by the workman). As a result, a means for setting an angle of the guide rail with respect to the datum is required.

Such an arrangement is known from U.S. Pat. No. 6,725,558 which describes an adjustable portable power tool guide having a base plate, a base plate cutting edge to define a cut line, an adjustable tool guide rail for guiding a portable power tool cutter adjacent to the cutting edge, and an adjustable control bar that defines a reliable and predetermined angle between the cutting edge and the control bar. However, this system is relatively complex and the integrated control bar results in the guide rail only being usable when the end of the rail incorporating the control bar overhangs an edge of the work-piece.

In U.S. Pat. No. 6,708,422 a saw guide for guiding hand-held power saws is described. The saw guide includes a fixed arm of L-shaped cross-section comprising respective horizontal and vertical legs. The horizontal leg rests on the upper surface of the material with the vertical leg extending downwardly to engage an edge of the material. An elongate variable angle arm also of L-shaped cross-section comprising respective horizontal and vertical legs is pivotally connected to the fixed arm by an adjustable angle locking assembly. The horizontal leg of the variable angle leg rests on the surface of the material with the vertical leg extending upwardly to form an elongate, straight saw guide surface for guiding the power saw. The adjustable angle locking assembly pivotally interconnects the fixed arm and the variable angle arm for rotation about a common pivot axis. The locking assembly is lockable with the fixed arm and the variable angle arm in a plurality of angular positions indicated on an angle indicia U.S. Pat. No. 4,608,761 describes a portable precision guide for powered hand tools having a base plate with a protractor portion and a table portion, a guide bar on one surface of the base plate guides a powered hand tool on the table portion and an angle arm pivotally mounted on the other surface of the base plate can be positioned by said protractor at a desired angle with said guide bar to position a work-piece for cutting.

EP 283553 describes a work bench for work-pieces to be worked by means of a hand tool such as a portable circular saw which contains a rectangular bench plate whose bench surface forms a mounting surface for the work-piece. Extending across the mounting surface is a guide rail which is held at a distance above the bench surface by means of supporting devices fastened to the bench plate in the area of the side surface.

U.S. Pat. No. 4,539,881 describes a guide plate for a hand power saw which has a top side with a low coefficient of friction for functioning with a guide member on the power saw, whereas the other or lower side of the plate has a slip-proof facing material for resting on a work-piece to be cut with the saw. Furthermore near one of its long edges the guide plate has a guide ridge with guide faces thereon running in the direction of sawing. A main part of the guide plate is placed on the one side of this ridge while the part on the other side of it is in the form of a ledge that is in a single plane with the lower face of the guide plate on the other side of the ridge. The lower side of the guide ridge is in this plane or is higher up than this plane. On the side of the main part of the guide plate furthest from the ridge there is a guide lip running in the direction of sawing that rests on the work-piece to be cut. This guide lip is made of non-splitting, elastic material running out from the side of the guide plate edge furthest from the guide ridge and the outermost edge of the lip is designed to be used as a cut marker.

One of the many problems identified with the prior art is the relative inaccuracy of the angular displacement of the rail to a datum on the work-piece. In particular, ensuring that a desired angular displacement between the rail and datum on a work-piece can be reproduced over various settings of different angles is problematic with prior art devices. The prior art devices are relatively complex where attempts have been made to overcome this problem.

Embodiments of the present invention aim to overcome problems associated with the prior art. Broadly, the present invention aims to provide a guide rail attachment which can be used to set accurately an angular displacement between a work-piece datum and the rail edge along which a cut is to be made. Furthermore, the present invention aims to provide an attachment which can easily be removed from a guide rail when it is not required by the end-user (for instance if the end user needs to make a straight cut but does not require an accurate angular alignment of the rail on a work-piece) and reattached with a high degree of repeatable accuracy.

BRIEF SUMMARY OF THE INVENTION

More specifically, a first aspect of the present invention provides a setsquare for use in conjunction with a power tool guide rail. The present invention preferably includes a body comprising an arm having a reference/vertical surface arranged to depend downwardly from an underside surface of a guide rail when the setsquare is in use and/or disposed on a guide rail, the vertical surface being arranged for abutting an edge of a work-piece. The present invention also preferably includes an attachment means pivotally disposed on the body for removable attachment of the setsquare to a portion of a guide rail, either in a predetermined position, or with a predetermined alignment with respect to an edge of the guide rail. The present invention further preferably comprises a track disposed on the body arranged to receive a pin disposed on a portion of the attachment means, wherein the track comprises a series of indents arranged to cooperate with the pin, the indents being arranged at predetermined positions along the track such that, during use, the vertical surface is disposable at a series of predetermined angular displacements with respect to an edge of a guide rail when the pin cooperates with any one of the indents.

Thus, the series of indents, which provide an indexing system, can be arranged at various predetermined points which correspond to utilised regularly angular displacements, such as 30 degrees and 45 degrees thereby providing accurate replication of the angular displacements.

Furthermore, a second aspect of the present invention provides a setsquare for use in conjunction with a power tool guide rail, preferably comprising a body comprising an arm having a reference/vertical surface arranged to depend downwardly from an underside surface of a guide rail when the setsquare is in use and/or disposed on a guide rail, the vertical surface being arranged for abutting an edge of a work-piece. The second aspect of the present invention also preferably includes an attachment means arranged removable attachment of the setsquare to a portion of a guide rail, such that the vertical surface is in a predetermined alignment with respect to an edge of the guide rail. The second aspect of the present invention further preferably includes locking means moveable between a locked and unlocked position such that the setsquare is removable from a guide rail when the locking means is in the unlocked position wherein the attachment means comprises a component having a cross section arranged such that, when the setsquare is removed and re-disposed on a guide rail and the locking means is in the locked position, the alignment of the vertical edge with respect to an edge of the guide rail remains unchanged.

Thus, accurate replication of the angle between the vertical surface and an edge of the guide rail is achieved when the setsquare is removed and re-attached to a guide rail.

Advantageously, both these aspects of the present invention can be combined to provide a set-square having the features and advantages associated with each aspect described above.

Preferably, the attachment means is slideably disposed on the body such that the attachment means is moveable between a first and second position with respect to the body, wherein, when in the first position the pin is out of engagement with any of the series of indents and when in the second position the pin can be arranged to cooperate with any one of the indents. As a result, the end-user is able to accurately set an angular displacement which is not provided by the indent indexing system.

Preferably, locking means can be arranged to lock the position of the attachment means with respect to the body. Thus, the angular displacement can be set and held in position without the worry of the angular displacement becoming displaced.

Preferably, the attachment means is pivotable about the locking means. Preferably, the locking means forms at least a portion of the attachment means. These arrangements simplify the components required.

Preferably, the component is arranged to cooperate with a channel formed on the underside of a guide rail. Furthermore, the cross section of the component is preferably 'V' shaped. Yet further, when in the locked position, the locking means is preferably arranged to force a narrow portion of the V-shaped component into engagement with a neck portion of a channel formed on the underside of a guide rail. As a result, accurate replication of angular displacements is achievable.

Preferably, a pointer can be disposed on one end of the attachment means, and a portion of the body is arced. The pointer is preferably arranged to follow a path coincident with or close to the arced portion of the body. Furthermore, a scale is preferably disposed on the arced portion of the body such that the pointer indicates on the scale an angular displacement between the vertical surface and an edge of a guide rail when the setsquare is disposed on a guide rail. Thus, the end-user can read the angle set with ease, and replicate that angle.

BRIEF DESCRIPTIONS OF THE DRAWINGS

An embodiment of the present invention is now described by way of example with reference to the accompanying drawings, of which:

DETAILED DESCRIPTION OF THE INVENTION

Prior art devices which are arranged to be detachable from guide rails suffer from the problem of the end-user being unable to ensure that the setsquare can be replaced on a guide rail such that the angle between an edge of the rail and a reference surface on the attachment is replicated accurately and repeatable. Being able to achieve accurate replication of angles set by the setsquare is a major requirement for the end-user, particularly for a professional workman. Furthermore, the professional end-user often requires their guide rail to have a degree of versatility whereby the guide rail can be used without the setsquare being attached, for instance. Thus, being able to remove a setsquare from the guide rail is required by the end-user.

Figure 1:
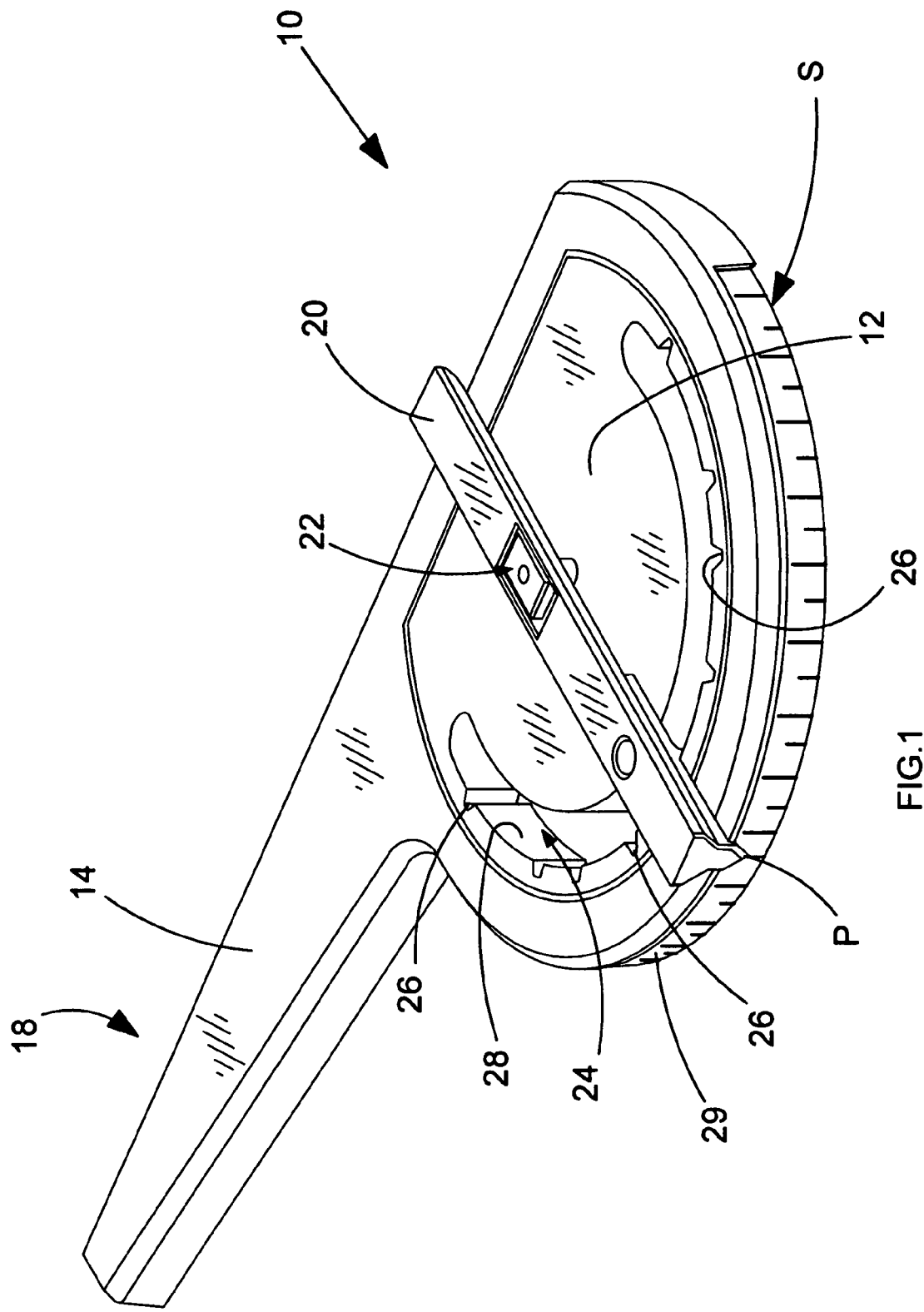
FIG. 1 is a schematic diagram of a guide rail attachment embodying the present invention.

With this in mind, and with reference to FIG. 1, a detachable setsquare 10 embodying the present invention is now described. The setsquare 10 preferably comprises a body portion 12 having an arm 14 extending therefrom. The arm comprises a vertical reference surface 18 which is flat and straight. The reference surface is used to abut against a datum surface, typically on the work-piece as described previously.

The setsquare also comprises an attachment means 20 for attaching the setsquare to a guide rail. The attachment means is preferably in the form of a linear bar. In this embodiment the setsquare is attached to a channel formed on the underside of a guide rail, as is described below. However, other ways to attach the setsquare to a rail are envisaged. The attachment means 20 is coupled to the body 12 of the setsquare by a locking means 22. The attachment means is described in more detail below.

The body 12 preferably comprises a track 24 which follows an arcuate path. A series of indentations 26 are preferably arranged at predetermined points along the outer surface 28 of the track. The indentations are arranged to cooperate with a pin or boss 35 extending from the underside of the attachment member and which runs in the track.

A pointer P is disposed at one end of the attachment bar. The pointer is preferably arranged so that a scale S printed onto a curved surface 29 of the body 12 can be read. The scale is arranged such that the end-user can determine the angular displacement between reference surface 18 and the longitudinal axis of the attachment means bar. As a result, when the setsquare is attached to a guide rail in the manner described below, the angular displacement between a longitudinal edge of the rail and the reference surface can be determined from the interaction of the pointer with the scale.

Figure 2:
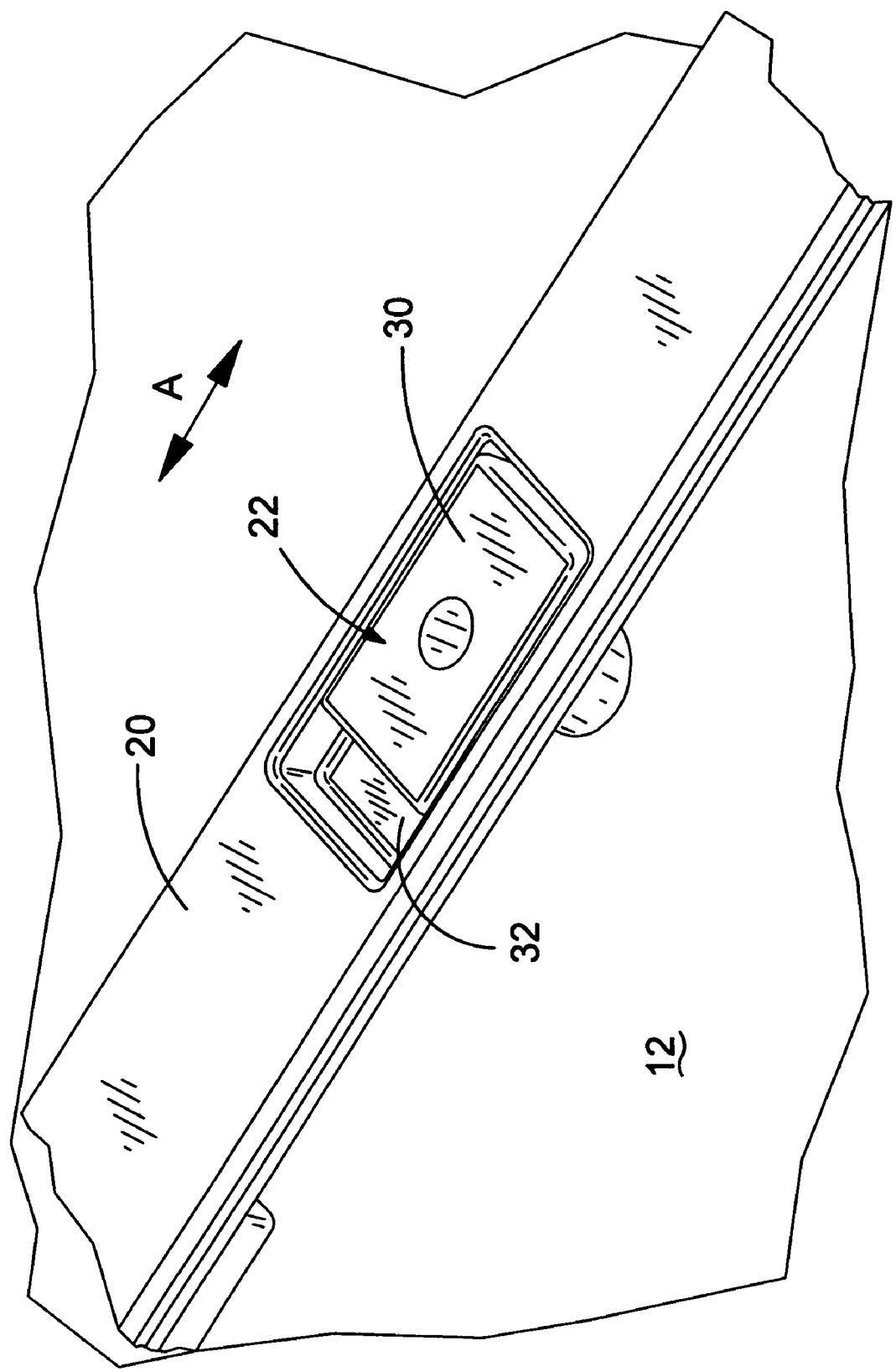
FIG. 2 shows details of a locking means of the attachment shown in FIG. 1.

Referring to FIG. 2, a portion of the attachment means is shown, along with a portion of the locking means. The locking means preferably comprises a rectangular shaped nut 30 which locates in a rectangular channel 32 disposed on the attachment means. The channel preferably has the same width dimension as the nut, but it has a larger length dimension. As a result, when the locking means is loose (that is, in an unlocked position), the attachment means is moveable with respect to the locking means (and hence the body of the setsquare) between two positions were the nut 30 is at either end of the channel respectively. The direction of movement is indicated by arrow A.

Figure 3:
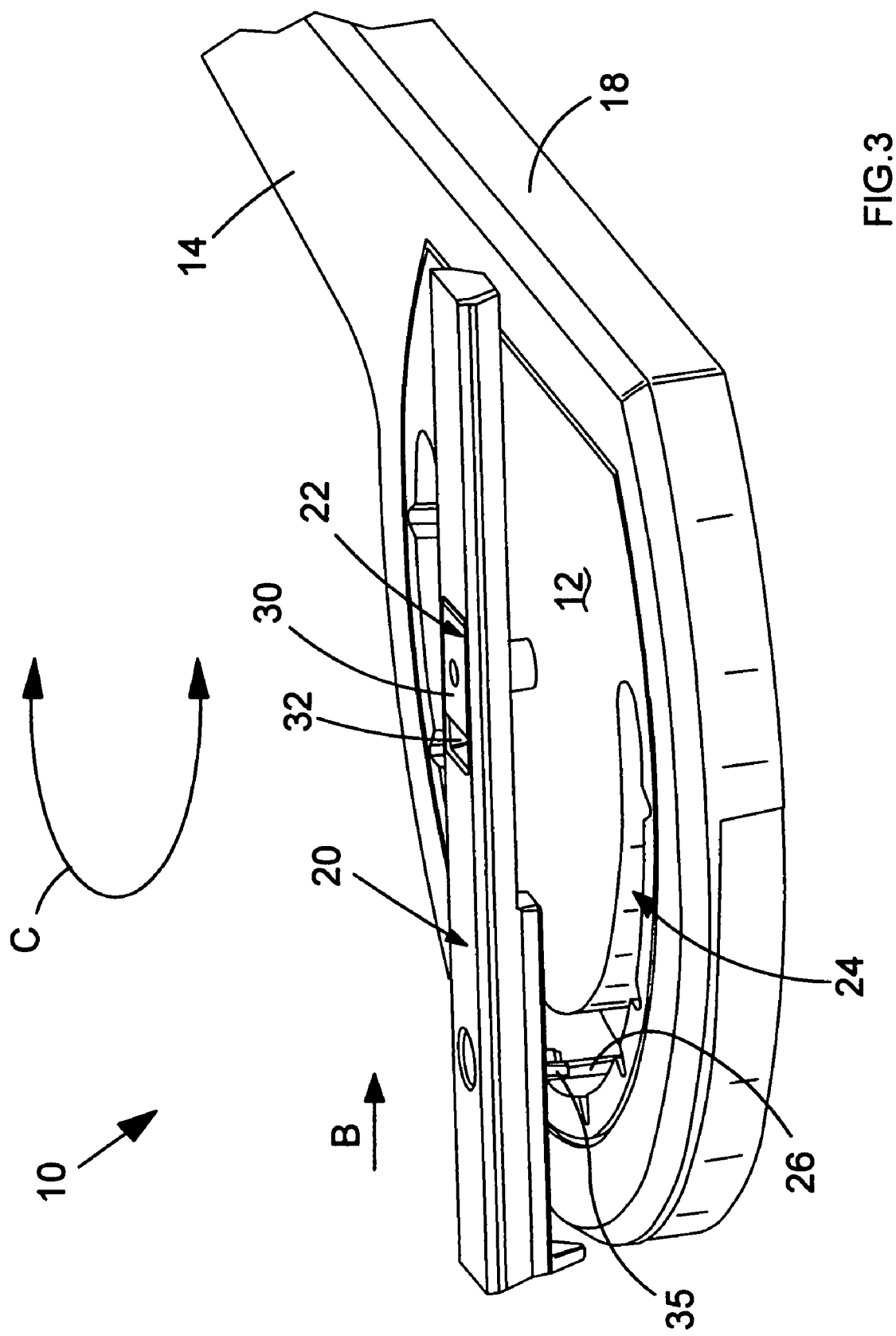
FIG. 3 is a schematic diagram of a guide rail attachment embodying the present invention.

This arrangement of the attachment means being moveable with respect to the body allows the pin to be slid into and out of engagement with any one of the track's indentations, thereby providing an indexing system for angular displacement of the attachment (and hence the guide rail when the setsquare is attached thereto). This arrangement is shown in FIG. 3. The pin 35 is shown in engagement with one of the indentations 26. However, it is understood that the attachment means can be slid in the direction indicated by arrow B thereby disengaging the pin with the indentation and allowing free rotation of the attachment means between two positions where the pin is disposed at either end of the track respectively. Thus, the attachment means is preferably rotatably moveable with respect to the body about a central pivot point coincident with the locking means, as indicated by arrow C.

Figure 4:
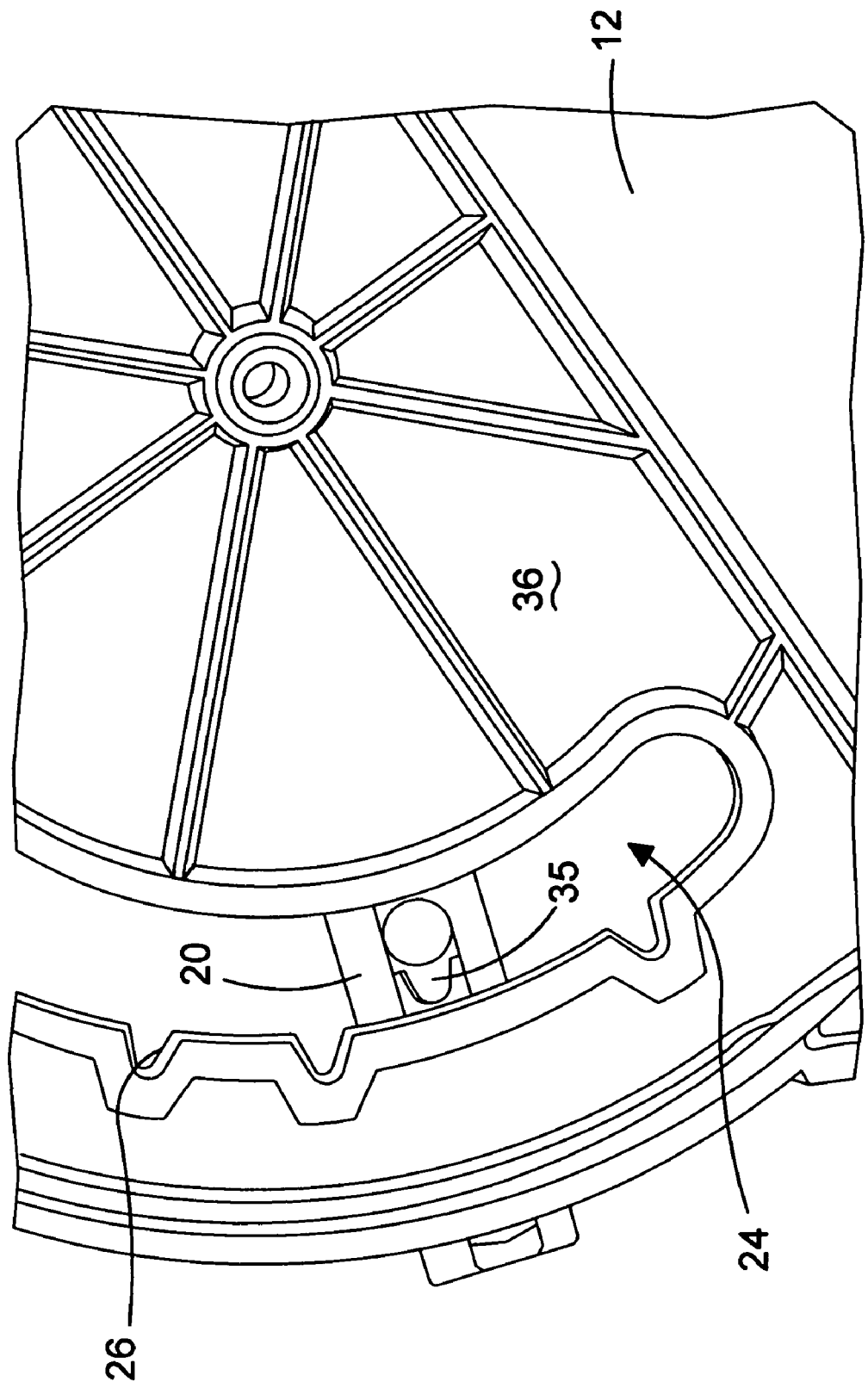
FIG. 4 shows a portion of an underside of the attachment of FIG. 3.

FIG. 4 shows the underside surface 36 of the body 12. The track 24 and indentations 26 are shown. Furthermore, the pin 35 disposed on the attachment means 20 is visible through the track 24. In this figure, the pin is disengaged from indentations.

Figure 5:
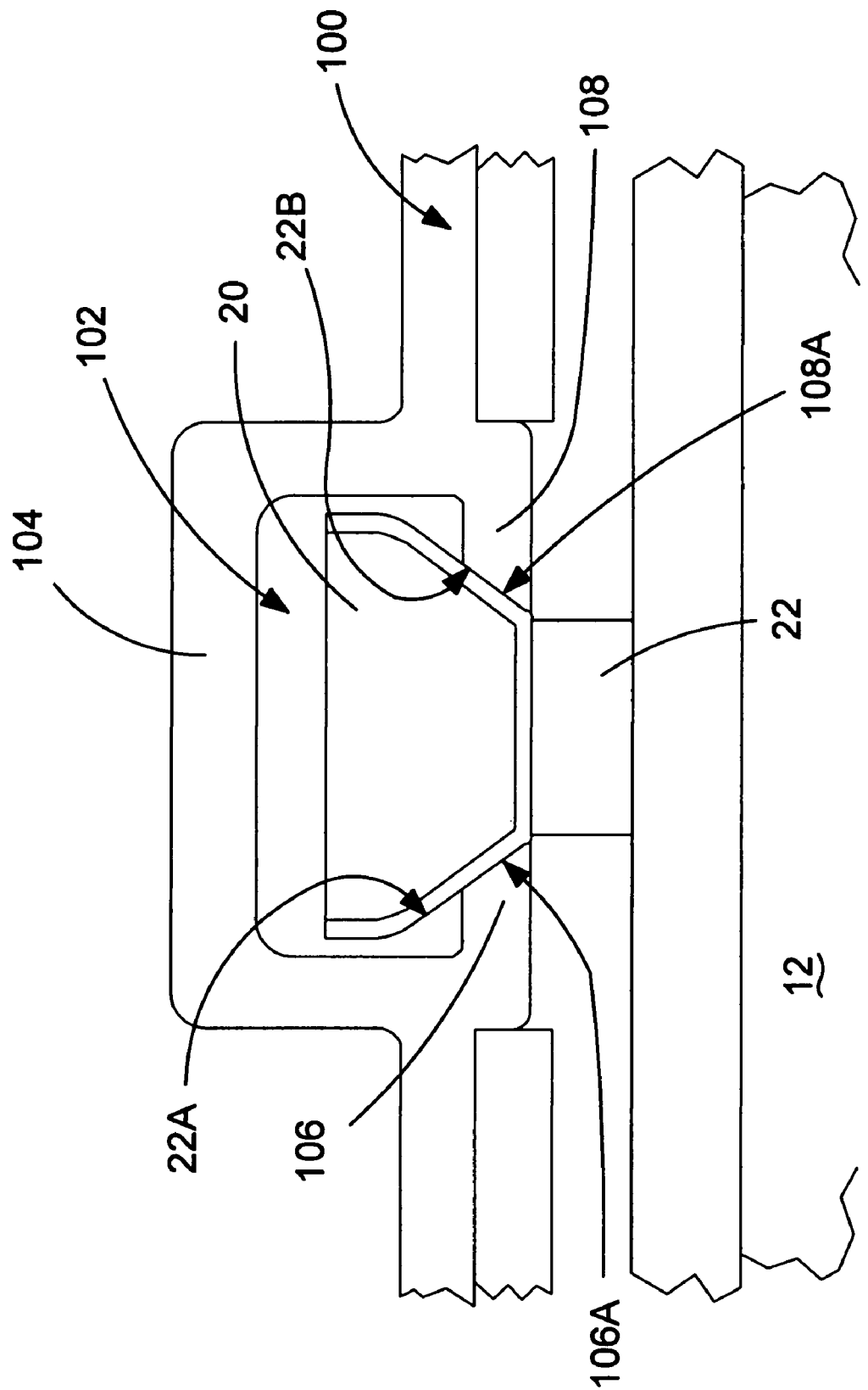
FIG. 5 shows a portion of the attachment of FIGS. 1 and/or 3 attached to a component of a guide rail.

Referring now to FIG. 5, a cross section of a portion of the setsquare is shown in use, attached to a guide rail 100. The attachment bar is preferably located within a channel 102 of the guide rail. The channel is formed in the underside of the rail and such that a rib 104 on the top surface of the rail is immediately opposite the channel. The rib is utilised to guide a power tool, as is known in the art. Thus, the rib (and hence the channel, and therefore the longitudinal axis of the attachment means when disposed in the channel) are parallel to the edge of the guide rail along which the cutting blade of a circular saw is moved during a cutting operation.

The channel preferably has an opening running along its length on the underside of the rail. The width of the opening is preferably less than the internal width dimension of the channel. In other words, the channel is partially closed by lip members 106 and 108 running along each side of the channel.

The cross section of the attachment means is preferably generally V-shaped having a width dimension at the top of the attachment means furthest from the body 12 greater than a width dimension closer to the body. In other words, the width of the attachment means narrows towards the body of the setsquare. Furthermore, the width dimension of the widest part of the attachment means is preferably less than the internal width dimension of the channel, but greater than the width dimension of an opening between lip member 106 and 108. Thus, during use, the side surfaces 22A and 22B of the attachment means engage with lip member side surfaces 106A and 108A. Preferably, both these surfaces are angled with respect to a vertical reference surface so that a surface-to-surface engagement occurs, as shown in FIG. 5.

The locking means can consist of a threaded lock or a cam lock which is arranged to move between a locked and unlocked position. In the unlocked position, a top surface of the body is not engaged with the guide rail's underside surface and the attachment means is free to move within the guide rail channel. As a result, the end-user can move the attachment along the length of the channel to a desired position. When in the locked position, however, the top surface of the body is forced by the locking means into engagement with the underside of the guide rail and the attachment means is drawn towards the body. As a result, the respective side surfaces of the attachment means and the lip members come into engagement and cooperate with one another. Frictional forces between the body, locking means, attachment means and guide rail channel prevent inadvertent movement of the setsquare when it is disposed on the guide rail and locked in position.

Furthermore, because the respective side surfaces are preferably sloped or angled with respect to a vertical reference, the disposition of the attachment means in the channel can be accurately controlled and replicated. In other words, when the locking means is activated and the setsquare is locked to the guide rail, the position of the attachment means in the channel of the guide rail is governed by the respective sloping surfaces of the lip members and attachment means: The attachment means returns to the same axial position with respect to the channel's longitudinal axis each time the locking means is released and reactivated. Thus, in an alternative embodiment (a fixed setsquare) where the attachment means is fixed in relation to the reference surface (18 in FIG. 1), say at 90 degrees to one another, a workman can repeatedly cut one or more work-pieces with a high degree of accuracy when the setsquare is removed and reattached to the guide rail.

Put another way, the cross section of the attachment means is arranged such that the setsquare can be removed and reattached to the guide rail with a high degree of consistency, whereby the angular displacement between a reference surface 18 of the setsquare and the intended line of cut to be made by a power tool disposed on the guide rail remains constant after each reattachment of the setsquare.

Other embodiments of the present invention are envisioned. For instance, the reference surface 18 could comprise two or more reference points protruding from a surface, rather than a flat surface per se. Different types of attachment means are also likely to be devised.

The invention claimed is:

1. A setsquare for use in conjunction with a power tool guide rail, comprising:
 a body comprising an arm having a vertical surface arranged to depend downwardly from an underside surface of a guide rail when the setsquare is in use and/or disposed on a guide rail, the vertical surface being arranged for abutting an edge of a work-piece;

an attachment member arranged to attach the setsquare to a portion of a guide rail, such that the vertical surface is in a predetermined alignment with respect to an edge of the guide rail; and a locking member moveable between a locked and unlocked position such that the setsquare is removable from a guide rail when the locking member is in the unlocked position, wherein the attachment member comprises a linear component having a cross section arranged such that, when the setsquare is removed and re-disposed on a guide rail and the locking member is in the locked position, the alignment of the vertical edge with respect to an edge of the guide rail remains unchanged.

2. The setsquare of claim 1, wherein the attachment member is pivotable about the locking member.

3. The setsquare of claim 1, wherein the locking member forms at least a portion of the attachment member.

4. The setsquare of claim 1, wherein the linear component is arranged to cooperate with a channel formed on the underside of a guide rail.

5. The setsquare of claim 1, wherein the cross section of the linear component has a substantially V-shape.

6. The setsquare of claim 5, wherein, when in the locked position, the locking member is arranged to force a narrow portion of the substantially V-shaped linear component into engagement with a neck portion of a channel formed on the underside of a guide rail.

7. A setsquare for use in conjunction with a power tool guide rail, comprising:

a body comprising an arm having a vertical surface arranged to depend downwardly from an underside surface of a guide rail when the setsquare is in use and/or disposed on a guide rail, the vertical surface being arranged for abutting an edge of a work-piece;

an attachment member pivotally disposed on the body for attaching the setsquare to a portion of a guide rail, either in a predetermined position or with a predetermined alignment with respect to an edge of the guide rail, the attachment member slidably disposed on the body such that the attachment is moveable between a first and second position with respect to the body; and a track disposed on the body arranged to receive a pin disposed on a portion of the attachment member, the track comprising a plurality of indents arranged to cooperate with the pin, the indents being arranged at predetermined positions along the track such that, during use, the vertical surface is disposable at a series of predetermined angular displacements with respect to the guide rail edge when the pin cooperates with any one of the indents, and when the attachment member is in the first position, the pin is out of engagement with any of the plurality of indents and, when the attachment member is in the second position, the pin can be arranged to cooperate with any one of the indents.

8. The setsquare of claim 7, further comprising a locking member arranged to lock the position of the attachment member with respect to the body.

9. The setsquare of claim 7, further comprising a pointer disposed on one of the attachment member, wherein a portion of the body is arcuate and the pointer is arranged to move along a path substantially coincident with the arcuate portion of the body.

10. The setsquare according to claim 9, wherein a scale is disposed on the arcuate portion of the body such that the pointer indicates on the scale an angular displacement between the vertical surface and an edge of a guide rail when the setsquare is disposed on a guide rail.

* * * * *